United States Patent [19]
Brown et al.

[11] 4,376,950
[45] Mar. 15, 1983

[54] THREE-DIMENSIONAL TELEVISION SYSTEM USING HOLOGRAPHIC TECHNIQUES

[75] Inventors: Hugh B. Brown, Fremont; Stephen C. Noble, Santa Clara; Bob V. Markevitch, Palo Alto, all of Calif.

[73] Assignee: Ampex Corporation, Redwood City, Calif.

[21] Appl. No.: 191,727

[22] Filed: Sep. 29, 1980

[51] Int. Cl.³ .............................................. H04N 9/54
[52] U.S. Cl. ...................................... 358/90; 358/2; 350/3.6; 350/3.68
[58] Field of Search ............... 358/90, 2; 350/3.61, 350/3.63, 3.68, 3.67, 3.85, 3.86; 265/216

[56] References Cited
U.S. PATENT DOCUMENTS

3,544,711  12/1970  De Bittetto ........................ 358/90
3,566,021   2/1971  Jakes, Jr. ............................ 358/90

OTHER PUBLICATIONS

Time "Acoustic–Making 3-D Pictures with Sound" Nov. 10, 1957.

*Primary Examiner*—Robert L. Griffin
*Assistant Examiner*—Edward L. Coles
*Attorney, Agent, or Firm*—George B. Almeida; Joel D. Talcott

[57] ABSTRACT

A hologram, produced by illuminating an object via a coherent light source and associated optics, or by digital components or photographic components, is imaged onto, for example, a television camera to selectively provide either a real time, or a non-real time, system. When written directly onto the camera, the hologram is used in a real time system, whereas the digital or film input to the camera provides the combination for a non-real time system. The image is converted into a corresponding electrical video signal via the camera, and the signal is supplied to a selected spatial light modulator. Subsequent illumination by a read coherent light source reconstructs the hologram into a three-dimensional image of the original subject matter, which then may be viewed via a selected optics system.

2 Claims, 2 Drawing Figures

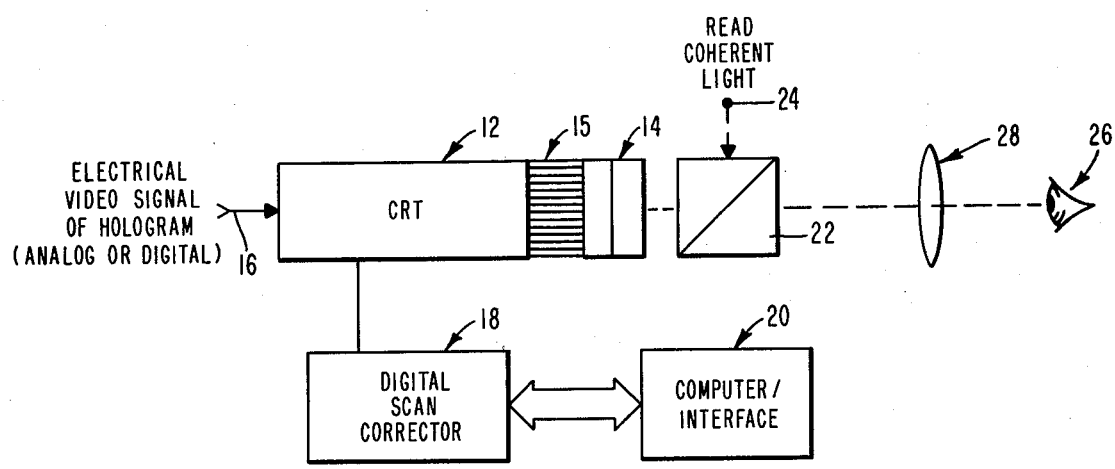
FIG_1
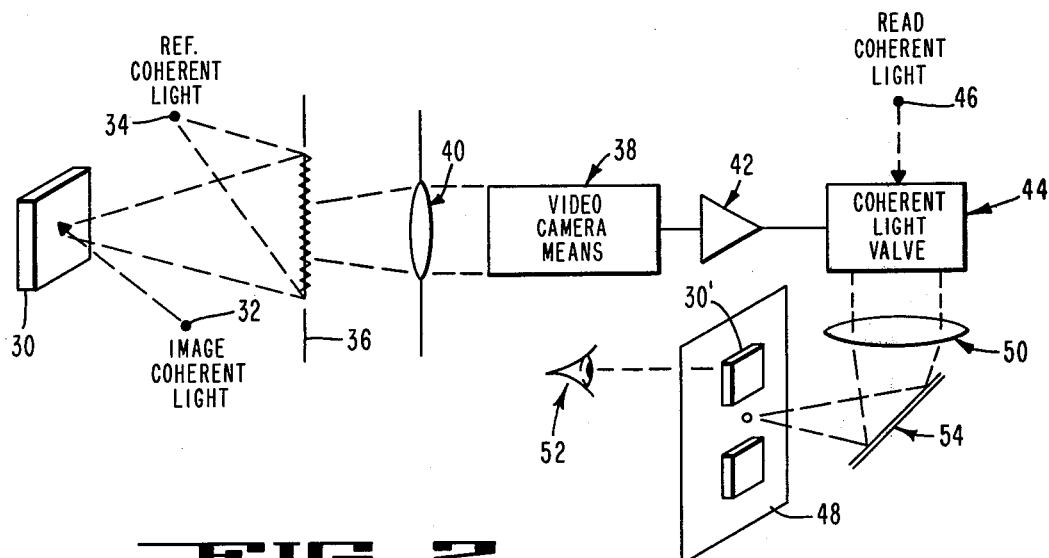
FIG_2

THREE-DIMENSIONAL TELEVISION SYSTEM USING HOLOGRAPHIC TECHNIQUES

BACKGROUND OF THE INVENTION

The invention relates to three-dimensional television systems and particularly to a television system for producing high quality three-dimensional images by means of holographic techniques.

Heretofore three-dimensional systems for viewing objects, continuous scenes, etc., have existed primarily in the motion picture field, wherein real time scenes were filmed by film cameras with optical polarizing filters, and utilizing various stereoscopic techniques where two images are viewed. The resulting films were viewed with polarized glasses to provide a simulation of a three-dimensional reproduction of the original scenes.

Similarly, the television field has also utilized a double television camera system to provide a stereoscopic three-dimensional apparatus. The resulting video images are viewed on adjacent monitors. The stereoscopic video signals also may be recorded for play back into the monitor system. The monitors are viewed from a distance by means of various arrangements of polarized stereo glasses, whereby a simulation of the original scenes were effected in three-dimensions.

Other three-dimensional television systems have employed high speed shutters to switch polarizers in and out to simulate the three-dimensional effect upon viewing a monitor with stereoscopic video time multiplexed to a single monitor.

Such three-dimensional systems are typified by those described in, for example, Proc. of 15th SPIE Symposium, "Three-dimensional Television", Vol. 3, p. 3–9, Sept. 1980; Proc. of 21st SPIE Symposium, "Very High Resolution Stereoscopic Television", Vol. 120, p. 208–212, Aug, 1977; SPIE, Vol. 199, Advances in Display Technology, p. 42–46, 1979.

As may be seen, prior art systems for generating three-dimensional images have parallax in either the vertical or horizontal axes, and generally require the use of two television cameras and associated channels of electronics, with attendent problems of maintaining the pictures alike, i.e., raster registration, size, brilliancy, focus, etc. Further, readout generally requires some form of visual aid such as polarizing glasses, hoods, etc.

SUMMARY OF THE INVENTION

The invention overcomes the problems of the prior art systems in providing a television system for recording and reproducing three-dimensional images of objects and/or of continuous scenes in real time, and of photographs, holograms, etc., in non-real time. To this end, means is provided to generate a hologram of the three-dimensional object or scene by creating an optical interference pattern between a coherent reference beam and a coherent signal beam reflected from the object or scene at a selected interference angle. The resulting hologram is converted to a corresponding electrical video signal by an optical-to-electrical transducer such as a vidicon, television camera, high resolution charge coupled device (CCD) array, etc. The video signal is processed by quality video processing circuits and may be transmitted via standard high quality video links. In one system, the video signal then is used to z-axis modulate a high resolution electrical-to-optical transducer, such as a cathode ray tube, to produce an image of the hologram. The reproduced hologram next is imaged onto an optical-to-optical transducer such as a liquid crystal light valve, via image lens optics or a fiber optic coupling. A read coherent light source, in combination with a polarizing beam splitter, is used to reconstruct the hologram into an image of the original object or scene, whereupon the reconstructed image is viewed in three-dimensions as, for example, via suitable image magnifying lens means.

In an alternate system, the electrical video signal is fed to an electrical-to-optical transducer such as a coherent light valve, which provides the holographic image.

Greater horizontal and vertical parallax can be achieved by using multiple vidicons and spatial light modulators to observe the object. It is contemplated that the object may be viewed over 360° with a complex video system. Unlike a stereoscopic system, the number of video channels is not limited.

BRIEF DESCRIPTION OF THE DRAWINGS

FIG. 1 is a block diagram of an electro-optical combination of a holographic television system of the invention.

FIG. 2 is a block diagram of an alternate embodiment of the invention combination of FIG. 1.

DESCRIPTION OF THE EMBODIMENTS

FIG. 1 depicts the combination of a high resolution cathode ray tube (CRT) 12 used to write onto an optical-to-optical transducer such as a liquid crystal light valve (LCLV) 14 manufactured by Hughes Aircraft Co., and depicted, for example, in the article "Application of the LCLV to Real-Time Optical Data Processing", Optical Engineering, Journal of the SPIE, Vol. 17, No. 4, July/Aug 1978, p. 371–384. A photoconductor-thermoplastic image transducer such as depicted in the article noted below, may be used in place of the LCLV 14 to provide image recording. The CRT 12 generates a holographic image which is written onto the LCLV 14 by a fiber optic coupling 15, or by suitable optical image lens. The CRT 12 and LCLV 14 of FIG. 1 thus define one of several spatial light modulator means which may be used. The input signal on input 16 may be an electrical video signal derived from a hologram of a selected object or scene, a digital holographic input derived digitally via software programs, etc. Thus, the input signal to the cathode ray tube may be generated as described below in FIG. 2 via a vidicon camera. Scan correction for the CRT 12 is provided via digital scan corrector 18 and computer/interface means 20 in generally conventional fashion.

Once the hologram is written onto the LCLV 14 it is read out by means of a polarizing beam splitter 22 illuminated by a read coherent light beam source 24. The reconstructed hologram is then observed as at 26 through an output optical system, depicted herein as a lens 28, which magnifies the small image produced by the active surface of the LCLV 14.

FIG. 2 depicts an alterative embodiment for producing a three-dimensional television image of an object or scene in real time. To this end, an object 30 is illuminated via an image coherent light source at 32. A reference coherent light source 34 provides a reference beam which is interfered with the image beam reflected from the object in generally conventional fashion. The resulting optical interference pattern at an interference plane 36 constitutes a hologram of the object, which is imaged onto an optical-to-electrical transducer such as a vidicon camera 38 via image lens means 40. The hologram thus is converted to a corresponding electrical video signal, which is processed by a generally conventional, high quality, video processor circuit represented herein by an amplifier 42. The video signal may be transmitted, or otherwise supplied to an electrical-to-optical transducer, e.g., a spatial light modulator such as a coherent light valve 44 manufactured by General Electric Corporation. The light valve 44 is an electrically addressed modulator that uses an electron beam to write onto an oil type substance therein. The oil is modulated by the electron beam and therefore spatially modulates the light passing therethrough to generate therein the holographic image. The input to the coherent light valve 44 also may be digitally generated, as described in FIG. 1.

In the readout process, the light valve 44 is illuminated by a read coherent light beam as at 46, to reconstruct the holographic image, whereby the object 30' is reproduced at a focus plane 48 via transform lens means 50, and suitable magnifying optics, mirrors, etc., as depicted at 54. The object then is viewed as at 52 in three dimensions in accordance with the invention.

As previously mentioned, the input system of FIG. 2, corresponding to the combination of the image and reference coherent light beams 32, 34, the image lens 40, the camera means 38 and the video processing circuits 42, provide an electrical video signal corresponding to the hologram of the object or scene, which signal may be supplied as the input signal to input 16 of FIG. 1.

Although the invention combination is herein described by means of spatial light modulators formed of a CRT/LCLV combination (FIG. 1), and of a coherent light valve (FIG. 2), other spatial light modulators, e.g., photoconductor-thermoplastic image transducers, electron beam addressed potassium dideuterium phosphate (DKDP) light valves, pockels readout optical modulators, etc., may be used. Examples of such spatial light modulator means is typified in the publication, Optical Engineering Journal of the SPIE, Vol. 17, No. 4, July/August, 1978, p. 334-371.

Likewise, a series of Bragg light cells may be used to replace the CRT 12 of FIG. 1, wherein one cell defines a modulator and two successive cells define x and y scan means in generally conventional manner. The television camera may also be replaced by a high resolution solid state image means such as those presently being developed in the television camera field.

The digital holographic input depicted at input 16 of FIG. 1 may be generated by computer-generated holographic techniques, for example, as illustrated in the article "Computer-Generated Holography and Optical Testing", Optical Engineering Journal of the SPIE, Vol. 19, No. 5, Sept/Oct, 1980, p. 679-685.

Accordingly, although a specific combination of components is depicted and described with respect to each of the FIGS. 1 and 2, the components may be interchanged as required by those skilled in the art.

We claim:

1. A holographic television system for generating three-dimensional images of selected subject matter, comprising;
   optical means for generating in real time an area hologram of the subject matter;
   electrooptical means coupled to the optical means for generating in real time an electrical video signal corresponding to the area hologram;
   electrical-to-optical transducer means coupled to the electrooptical means and including cathode ray tube means having a scanning electron beam, for continuously generating in real time successive images of the area hologram in response to modulation by the electrical video signal;
   optical-to-optical transducer means including liquid crystal light valve means for continuously optically storing in real time the successive images;
   fiber optic coupling means disposed between the cathode ray tube means and the liquid crystal light valve means; and
   readout means including polarizing beam splitter means and a continuous read coherent light beam for continuously illuminating the holographic image to reconstruct the hologram as a three-dimensional image of the subject matter.

2. The system of claim 1 wherein the optical and the electrooptic means include computer means for generating the successive holograms of the selected subject matter and for supplying the corresponding electrical video signal in the digital domain to the cathode ray tube means.

* * * * *